(12) United States Patent
Pouzolz

(10) Patent No.: US 7,808,403 B2
(45) Date of Patent: Oct. 5, 2010

(54) DISPLAY SYSTEM FOR AN AIRCRAFT

(75) Inventor: François Pouzolz, Toulouse (FR)

(73) Assignee: Airbus France, Toulouse (FR)

( * ) Notice: Subject to any disclaimer, the term of this patent is extended or adjusted under 35 U.S.C. 154(b) by 293 days.

(21) Appl. No.: 12/089,655

(22) PCT Filed: Oct. 17, 2006

(86) PCT No.: PCT/FR2006/002325

§ 371 (c)(1),
(2), (4) Date: Apr. 9, 2008

(87) PCT Pub. No.: WO2007/045753

PCT Pub. Date: Apr. 26, 2007

(65) Prior Publication Data

US 2008/0246633 A1   Oct. 9, 2008

(30) Foreign Application Priority Data

Oct. 18, 2005   (FR) .................................. 05 10583

(51) Int. Cl.
*G01C 23/00* (2006.01)
(52) U.S. Cl. ...................... 340/971; 340/973; 340/945; 340/975; 340/980; 340/988; 345/169; 345/173; 345/181

(58) Field of Classification Search ................. 340/971, 340/973, 945, 975, 980, 988; 345/169, 173, 345/181
See application file for complete search history.

(56) References Cited

U.S. PATENT DOCUMENTS

| 6,112,140 | A | 8/2000 | Hayes |
| 6,281,810 | B1 | 8/2001 | Factor |
| 7,042,387 | B2 * | 5/2006 | Ridenour et al. .......... 342/26 B |
| 7,479,949 | B2 * | 1/2009 | Jobs et al. .................. 345/173 |
| 2006/0164260 | A1 | 7/2006 | Thales |

FOREIGN PATENT DOCUMENTS

FR   2 846 296   4/2004

OTHER PUBLICATIONS

International Search Report dated Feb. 14, 2007 w/ English translation.
J. Morgan, et al., "MD-11 Electronic Instrument System," Proceedings of the Digital Avionics Systems Conference, IEEE, vol. Conf. 11, Oct. 1992, pp. 248-253.

* cited by examiner

*Primary Examiner*—Tai T Nguyen
(74) *Attorney, Agent, or Firm*—Dickinson Wright PLLC

(57) ABSTRACT

A display system for an aircraft includes an automatic reconfiguration device that, upon detecting a failure of a screen of the system, displays an image that is associated with the failed screen on an associated valid screen having lesser priority.

8 Claims, 2 Drawing Sheets

DISPLAY SYSTEM FOR AN AIRCRAFT

FIELD OF THE INVENTION

The present invention relates to a display system for an aircraft, in particular a civil transport airplane.

More specifically, it relates to a display system of the type comprising a plurality of screens each of which is formed so as to be able to display an image which is associated with it. In the context of the present invention, the term "image" is to be understood as meaning a page of information, specified below, which can be viewed on the associated screen.

BACKGROUND OF THE RELATED ART

Such a display system, which is installed in the cockpit, is intended in a conventional manner to provide the pilot or pilots of the aircraft with information (such as altitude, speed, attitude, navigation, engine speeds, status of systems, etc.) which is used by the pilot or pilots during a flight of the aircraft. Some of this information, for example short-term piloting information, is critically necessary for the pilot or pilots to fly the aircraft in complete safety.

Hence, a failure of a screen which displays an image containing information which is absolutely necessary for piloting gives rise to a serious safety problem for the aircraft. Specific search procedures are usually provided to allow the pilot to find at least some of the information lost by the failure. However, such search procedures involve a very heavy workload for the pilot, a workload which often appears excessive especially in flight phases (such as landing or take-off, for example) in which the operations of piloting the aircraft require the full attention of the pilot.

SUMMARY OF THE INVENTION

The present invention relates to a display system for an aircraft whereby the aforementioned disadvantages can be overcome.

According to the invention, said display system of the type comprising a plurality of screens each of which is formed so as to be able to display an image, and a particular image being associated with each of said screens, is notable for the fact that it additionally comprises:

detection means for detecting any failure of one of said screens; and automatic reconfiguration means intended, upon the detection of a failure of at least one screen by said detection means:

to automatically check if the image which is associated with said failed screen has priority over at least one other image associated with another screen, based on at least one set of predetermined priority rules; and when the image which is associated with said failed screen has priority, to display this image on a valid screen with which there is associated an image which has a lower priority according to said set of priority rules.

Thus, by virtue of the invention, in the event of failure of a screen which comprises a priority image, in particular an image containing information which is absolutely necessary for piloting, such as short-term piloting information (speed, attitude, altitude, etc.) for example, this priority image is automatically displayed on another screen which is valid (that is to say which is not in a state of failure).

Therefore, the most important information is always available to the pilot of the aircraft, even in the event of failure of one or more screens of said display system.

Furthermore, since the image reconfiguration (or changing of the displayed image) according to the invention is performed automatically, it does not require any action on the part of the pilot, who can thus remain fully focused on piloting in the event of failure of a screen.

In one preferred embodiment which makes it possible to minimize the interactions between the various screens so as to make the display system according to the invention particularly robust, said automatic reconfiguration means comprise a plurality of auxiliary means, each of which is associated with one of said screens, automatically commands the display produced on the associated screen, and for this purpose comprises a status table for the associated screen which indicates the image that said associated screen should display automatically as a function of a validity status of at least some of the other screens and as a function of said set of priority rules.

Preferably, these priority rules are chosen so as to optimize in real time the operational configuration of the display in the cockpit as a function of the operational requirement of the pilots.

Furthermore, in one preferred embodiment, said display system additionally comprises manual reconfiguration means allowing an operator to manually command the display of a particular image on at least one of said screens of the display system. Thus, by virtue of the invention, the pilot of the aircraft is always able to command the display of any image which he desires to see displayed, and in particular an image which was initially displayed on a screen and which has been replaced by a priority image following a screen failure.

In one specific embodiment, said manual reconfiguration means comprise:

first actuable means for directly commanding the display of a particular image on a valid screen. Thus, the pilot can have direct access to a particular image by using a short cut; and/or second actuable means for commanding the display on a valid screen of a plurality of images which are displayed cyclically in a pre-established order and successively upon each actuation of said second means. Provision can thus be made for the pilot to be able to have access on one and the same screen to all or to some of the existing images, for example when there are a plurality of screen failures. Moreover, as a result of this cyclic command, the various images in question are displayed successively, thus allowing the pilot to select a sought image simply and rapidly; and/or third actuable means for commanding the display on a valid screen of two different images which are displayed successively in an alternating manner upon each actuation of said third means. The latter feature is particularly suitable for the successive display on one and the same screen of two different images both comprising important information, such as, for example, short-term piloting information on the one hand and navigation information on the other hand.

In one specific embodiment, said display system comprises a plurality of personal screens intended (personally) for one and the same pilot (chief pilot or copilot) of the aircraft and comprising a first screen with which there is associated a first image concerning short-term piloting information, and said automatic reconfiguration means are formed so as:

to display said first image on a valid personal screen in the event of failure of said first screen; and to prevent two identical images from being displayed simultaneously on two different personal screens.

Furthermore, said display system advantageously comprises a plurality of common screens simultaneously intended for two pilots (chief pilot and copilot) of the aircraft and comprising a first screen with which there is associated a first image concerning information relating at least to the engines of the aircraft, and said automatic reconfiguration means are formed so as:

to display said first image on a valid common screen in the event of failure of said first screen; and to prevent two identical images from being displayed simultaneously on two different common screens.

BRIEF DESCRIPTION OF THE DRAWINGS

The figures of the appended drawing will give a clear understanding of how the invention can be implemented. In these figures, identical references denote like elements.

DETAILED DESCRIPTION OF THE INVENTION

Figure 1:
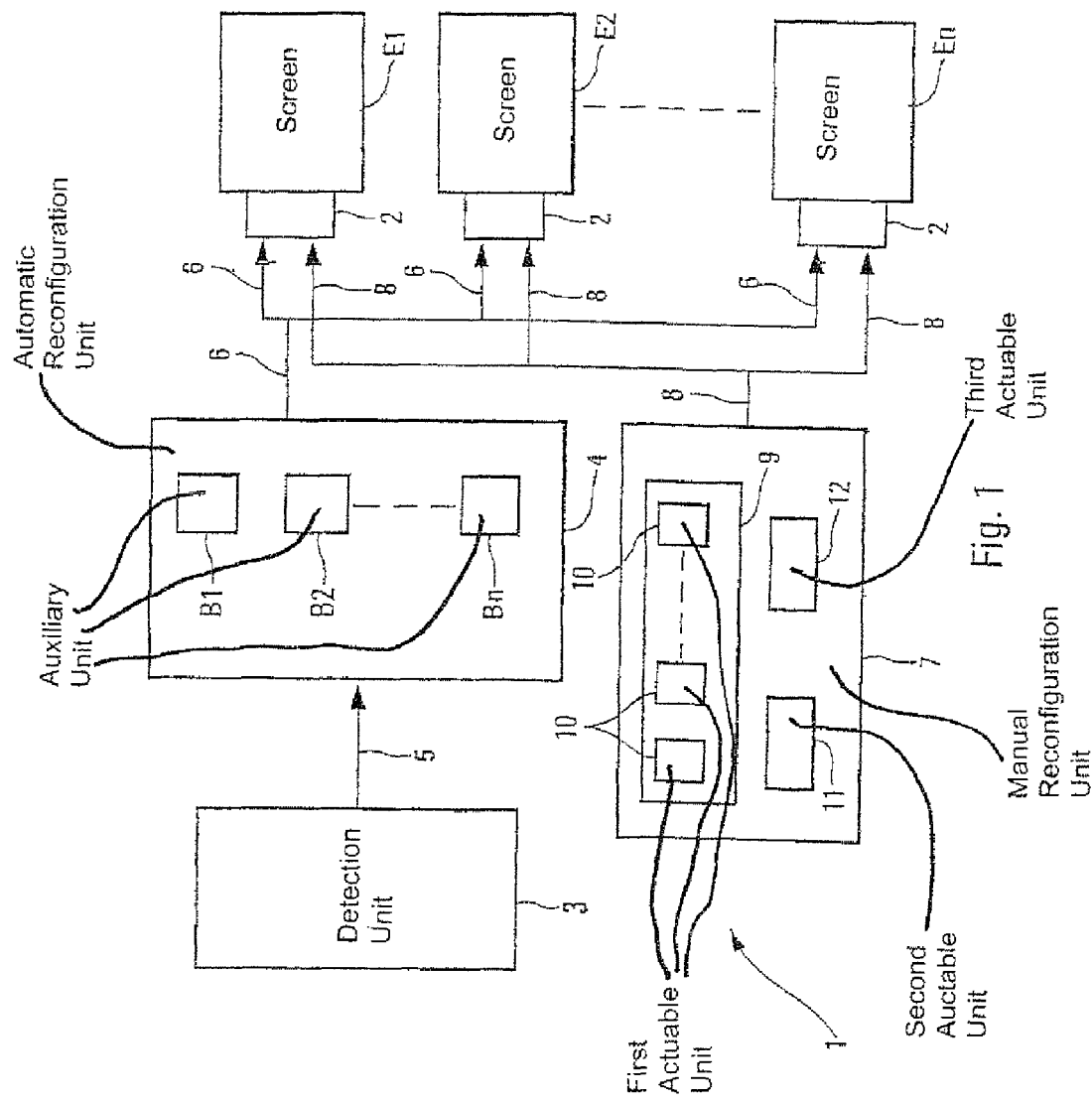
FIG. 1 is a block diagram of a display system according to the invention.

The display system 1 according to the invention, which is represented schematically in FIG. 1, is installed in the cockpit of an aircraft (not shown), in particular a transport airplane, and is intended in the conventional manner to provide the pilot of the aircraft with information, specified below, which is used by said pilot during a flight of said aircraft.

To this end, said display system 1 comprises a plurality of screens E1, E2, . . . , En, for example liquid crystal display (LCD) screens of the known type. Each of said screens E1 to En is able to display an image which is associated with it and for this purpose comprises a conventional means 2 particularly intended for shaping the image to be displayed.

In the context of the present invention, the term "image" is to be understood as meaning a page containing information specified below, this page being able to be viewed on the associated screen E1 to En.

According to the invention, said display system 1 additionally comprises:

detection means 3 for detecting any failure likely to occur on one of said screens E1 to En. In the context of the present invention, a screen will be considered to be in a state of failure when it is not capable of displaying an image, in particular because it has a malfunction or simply because it is off; and automatic reconfiguration means 4 which are connected via a link 5 to said detection means 3 and via links 6 to the elements 2 of said screens E1 to En, and which are formed so as to carry out the following operations upon the detection of a failure of at least one screen E1 to En by said detection means 3:

automatically check if the image which is associated with the failed screen has priority over another image associated with another screen, based on at least one set of predetermined priority rules, which will be specified below; and when the image which is associated with said failed screen has priority, display this image on a valid screen with which there is associated an image which has a lower priority according to said set of priority rules.

Thus, by virtue of the display system 1 according to the invention, in the event of failure of a screen which comprises a priority image, in particular an image containing information which is absolutely necessary for piloting, such as short-term piloting information (speed, attitude, altitude, etc.) for example, this priority image is automatically displayed on another screen which is valid (that is to say which is not in a state of failure).

Therefore, the most important information is always available to the pilot of the aircraft, even in the event of failure of one or more screens of said display system 1.

Furthermore, since the means 4 perform the image reconfiguration automatically, this image reconfiguration (that is to say the changing of displayed image) requires no action on the part of the pilot, who can thus remain fully focused on piloting in the event of failure of a screen.

In one specific embodiment, said detection means 3 correspond to monitoring loops which scrutinize the status and the configurations of the screens.

Moreover, in one preferred embodiment which makes it possible to minimize the interactions between the various screens E1 to En so as to make the display system 1 according to the invention particularly robust, said automatic reconfiguration means 4 comprise a plurality of auxiliary means B1, B2, . . . , Bn, each of which:

is respectively associated with one of said screens E1, E2, . . . , En;

automatically commands the display produced on the associated screen; and for this purpose comprises a status table for the associated screen which indicates the image that said associated screen should display automatically as a function of the validity status (valid/failed) of at least some of the other screens (a screen which is not detected to be in a state of failure by the detection means 3 is considered to be valid) and as a function of said set of priority rules.

In one specific embodiment, said auxiliary means B1 to Bn can be respectively integrated directly into the means 2 of the corresponding screens E1 to En.

Furthermore, said display system 1 additionally comprises manual reconfiguration means 7 which are connected via links 8 to said means 2 of said screens E1 to En and which are formed so as to allow an operator, in particular a pilot of the aircraft, to manually command the display of a particular image on at least one of said screens E1 to En. Thus, by virtue of said manual reconfiguration means 7, the pilot of the aircraft is always able to command the display of any image which he desires to see displayed, and in particular an image which was initially displayed on the screen in question and which has been replaced by a priority image following a screen failure.

In one specific embodiment, said manual reconfiguration means 7 comprise a set 9 of actuable means 10, for example keys, each of which is associated with a particular image. The actuation of any one means 10 makes it possible to directly command the display of the corresponding image on a valid screen. This valid screen normally represents the screen with which there is associated the image whose display is commanded, and in the event of failure of this screen it represents another valid screen of the display system 1.

Thus, by virtue of said set 9 of actuable means 10, the pilot can have direct access, in the form of a shortcut, to the various images associated with said means 10.

Said manual reconfiguration means 7 also comprise at least one actuable means 11, for example a key or a turn-button, for commanding the display of a plurality of images on a valid screen or for commanding the display of a plurality of configurations of images on a set of valid screens. These images are displayed cyclically in a pre-established order and successively upon each actuation of said means 11. A pilot of the aircraft is thus able to have access to all the existing images, in particular when there are a plurality of screen failures. Furthermore, as a result of such a cyclic command, the various images or configurations of images in question are displayed successively, which allows the pilot to choose the sought image simply and rapidly. The list of images which is taken into account can, for example, be accessible via one of the valid screens, thereby facilitating the selection.

By virtue of said means 11, the pilot does not have to be aware of a failure. Indeed, all that is required of him is to actuate this means 11 to find the lost image following a screen failure, thereby providing an obvious operational gain.

Furthermore, said manual reconfiguration means 7 comprise at least one means 12, for example a key or a turn-button, for commanding the display on a valid screen of two different images which are successively displayed in an alternating manner upon each actuation of said means 12. This means 12 is particularly suitable for the successive display on one and the same screen of two different images both comprising important information, such as, for example, short-term piloting information on the one hand and navigation information on the other hand.

Figure 2:
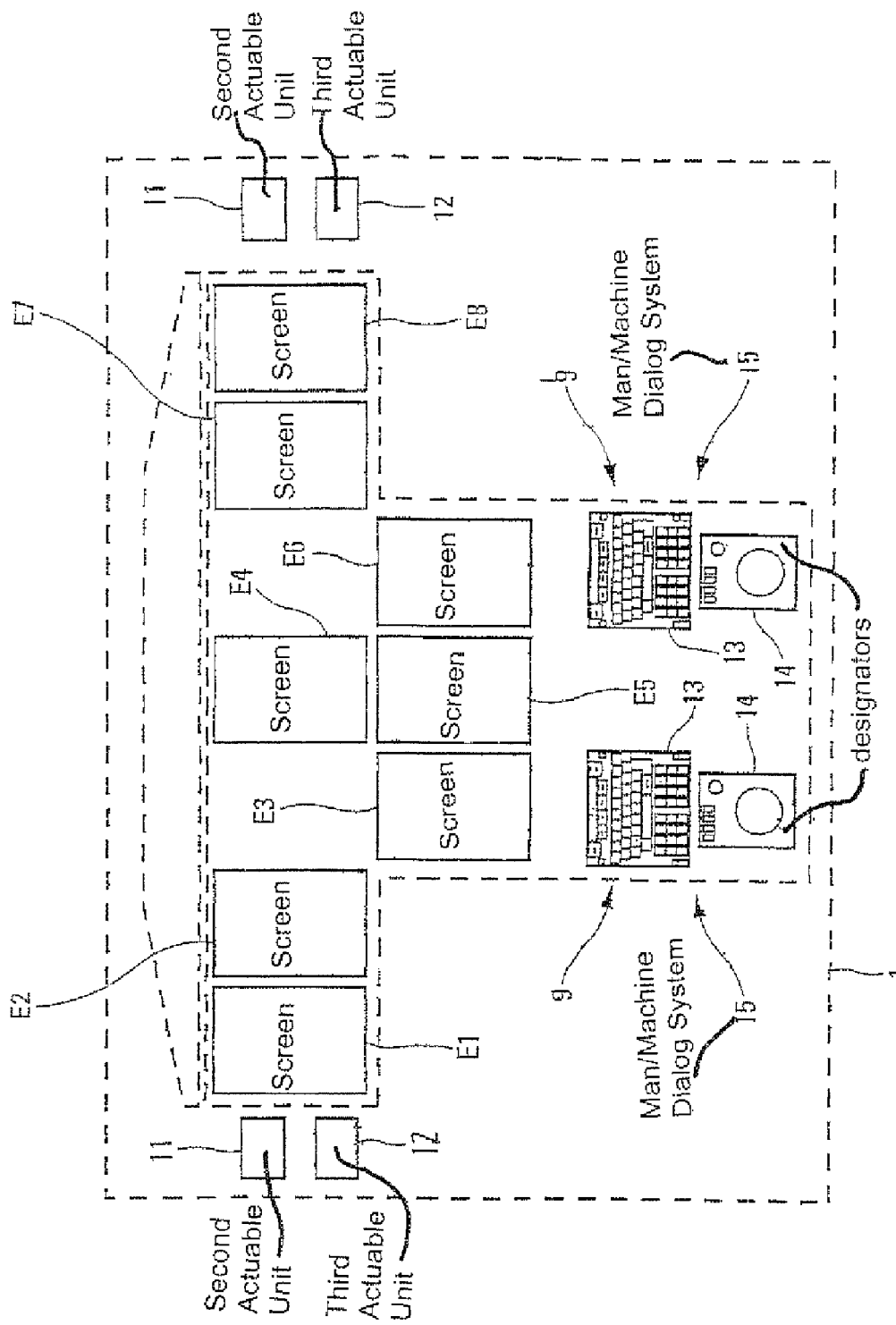
FIG. 2 schematically illustrates an example of the arrangement of screens of a display system according to the invention.

FIG. 2 shows one specific example of the arrangement of various means of the display system 1 in the cockpit of an aircraft. In this example, the screens E1, E2 and E3, which are situated on the left part of the cockpit, are personal screens intended (personally) for the pilot of the aircraft. Furthermore, the screens E6, E7 and E8, which are situated on the right part of the cockpit, are personal screens intended (personally) for the copilot of the aircraft. As for the central screens E4 and E5, they are common both to said pilot and said copilot.

In the example represented in FIG. 2, the manual reconfiguration means 7 (set 9 of means 10, means 10 and 11) are split in two and made available both to the pilot (left side) and the copilot (right side). In particular, the set 9 of means 10 may correspond to a set of keys of a keyboard 13 which, together with a designator 14, for example a rotatable ball, forms part of a man/machine dialog system 15.

In normal operation the screens E8, E7 and E6 preferably display the same images as the screens E1, E2 and E3, respectively.

By way of illustration, said display system 1 may, for example, display:
- on the screens E1 and E8, for example primary flight display (PFD) screens, a PF image containing conventional short-term piloting information, such as speed, altitude and/or an artificial horizon which inclines when the aircraft inclines;
- on the screens E2 and E7, for example navigation display (ND) screens, an image N containing conventional navigation information;
- on the screens E3 and E6, for example multi-function display (MFD) screens, an MF image containing information relating to the monitoring, navigation and communication systems of the aircraft;
- on the common screen E4, for example an engine and warning display (EWD) screen, an EW image containing information relating to the engines and warnings; and
- on the common screen E5, for example a system display (SD) screen, an image S containing information regarding the monitoring of systems of the aircraft.

In this specific example, said automatic reconfiguration means 4 take particular account of the following set of (priority) rules:
- in the absence of a screen failure, the aforementioned displays are implemented;
- if the screen E1 is in a state of failure, the image PF is automatically displayed on the screen E2 in place of the image N (or another image) which is displayed at that moment;
- if the screen E8 is in a state of failure, the image PF is automatically displayed on the screen E7 in place of the image N (or another image) which is displayed at that moment;
- if the screen E4 is in a state of failure, the image EW is automatically displayed on the screen E5 in place of the image S (or another image) which is displayed at that moment;
- the images EW and S must not be displayed on both sides (pilot, copilot) at the same time;
- one and the same image must not be displayed at the same time on two or three of the personal screens E1, E2, E3 of the pilot;
- one and the same image must not be displayed at the same time on two or three of the personal screens E6, E7, E8 of the copilot; and
- one and the same image must not be displayed at the same time on the two common screens E4 and E5.

The display system 1 according to the invention makes it possible to ensure maximum availability of the information for the pilot or pilots in the event of screen failure while at the same time simplifying the interactions between the pilot or pilots and said display system 1. Said display system 1 thus makes it possible to minimize the effects of a screen failure on the workload of the pilot or pilots.

Furthermore, said display system offers the pilot or pilots a set of operationally optimized image configurations, irrespective of the screen failure scenarios, with a simplified man/machine interface.

The invention claimed is:

1. A display system for an aircraft, said system comprising:
a plurality of screens each of which is formed so as to be able to display an image, and a particular image being associated with each of said screens;
detection means for detecting any failure of one of said screens; and
automatic reconfiguration means intended, upon the detection of a failure of at least one screen by said detection means:
to automatically check if the image which is associated with said failed screen has priority over at least one other image associated with another screen, based on at least one set of predetermined priority rules; and
when the image which is associated with said failed screen has priority, to display this image on a valid screen with which there is associated an image which has a lower priority according to said set of priority rules, wherein said automatic reconfiguration means comprise a plurality of auxiliary means, each of which is associated with one of said screens and for this purpose comprises a status table for the associated screen which indicates the image that said associated screen should display automatically as a function of a validity status of at least some of the other screens and as a function of said set of priority rules.

2. The system as claimed in claim 1, wherein it additionally comprises manual reconfiguration means allowing an operator to manually command the display of a particular image on at least one of said screens.

3. The system as claimed in claim 2, wherein said manual reconfiguration means comprise first actuable means for directly commanding the display of a particular image on a valid screen.

4. The system as claimed in claim 2, wherein said manual reconfiguration means comprise second actuable means for commanding the display on a valid screen of a plurality of images which are displayed cyclically in a pre-established order and successively upon each actuation of said second means.

5. The system as claimed in claim 2, wherein said manual reconfiguration means comprise third actuable means for commanding the display on a valid screen of two different images which are displayed successively in an alternating manner upon each actuation of said third means.

6. The system as claimed in claim 1, wherein it comprises a plurality of personal screens intended for one and the same pilot of the aircraft and comprising a first screen with which there is associated a first image concerning short-term piloting information, and said automatic reconfiguration means are formed so as:
- to display said first image on a valid personal screen in the event of failure of said first screen; and
- to prevent two identical images from being displayed simultaneously on two different personal screens.

7. The system as claimed in claim 1, wherein it comprises a plurality of common screens simultaneously intended for two pilots of the aircraft and comprising a first screen with which there is associated a first image concerning information relating at least to the engines of the aircraft, and said automatic reconfiguration means are formed so as:
- to display said first image on a valid common screen in the event of failure of said first screen; and
- to prevent two identical images from being displayed simultaneously on two different common screens.

8. An aircraft, wherein it comprises a display system as claimed in claim 1.

* * * * *